April 22, 1930.  G. WRAY  1,755,756
APPARATUS FOR DELIVERING LIQUIDS IN MEASURED QUANTITIES BY VOLUME
Filed July 1, 1926   10 Sheets-Sheet 2
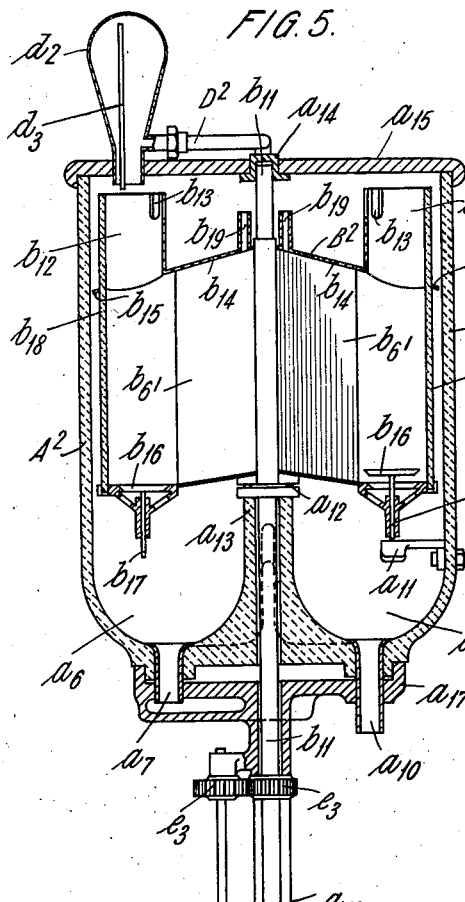
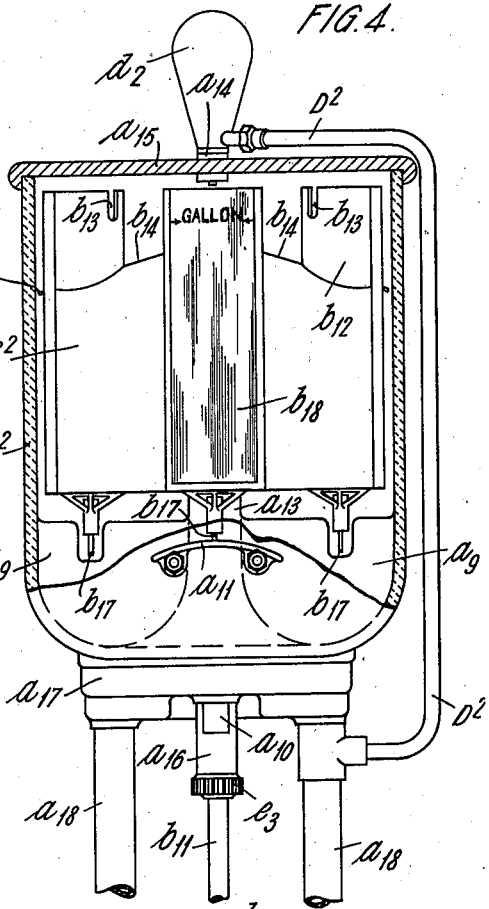
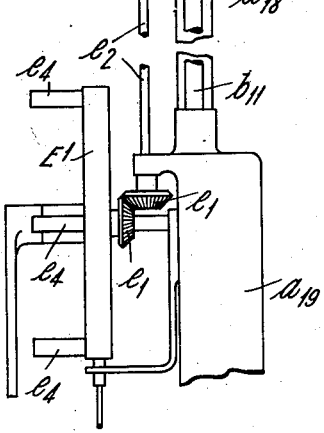
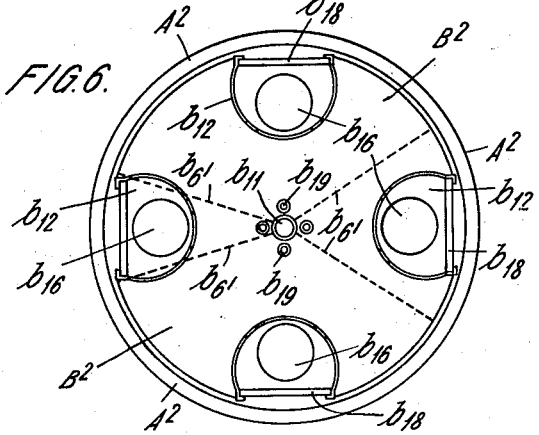
INVENTOR:
GEORGE WRAY

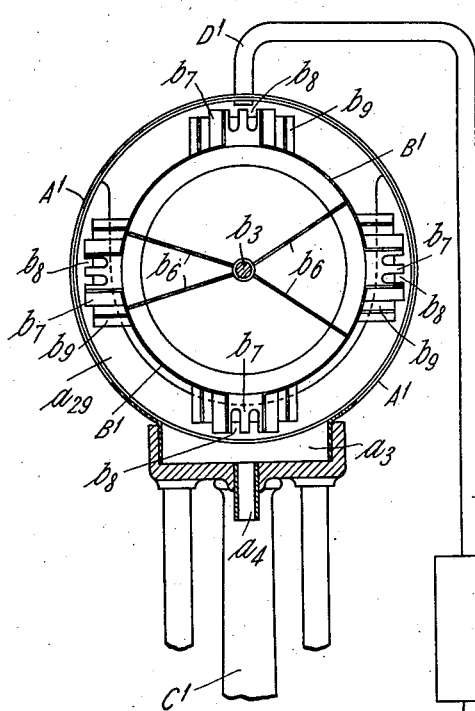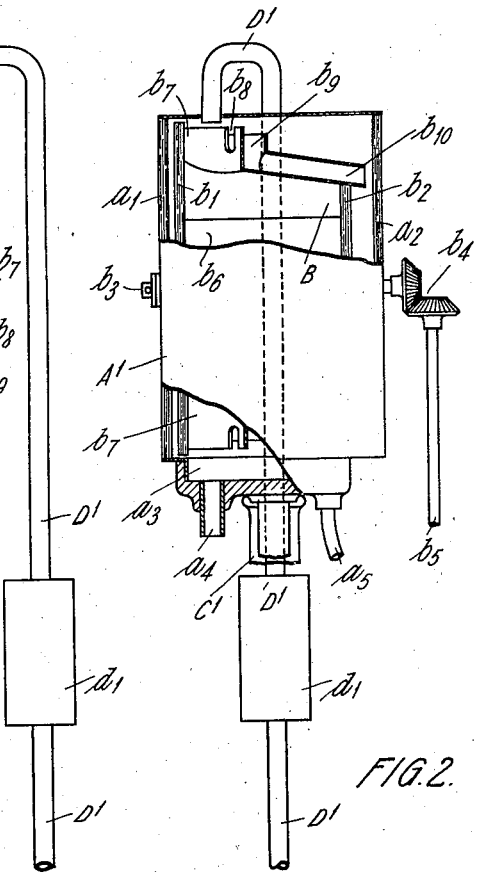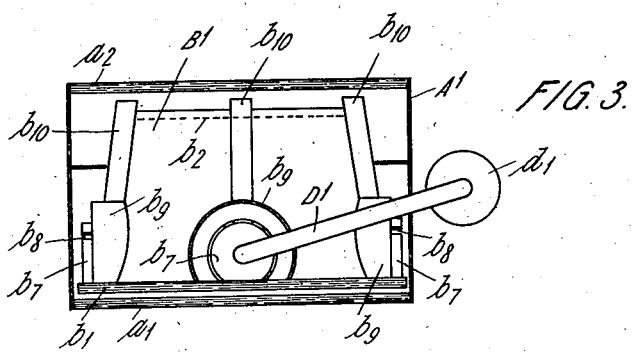

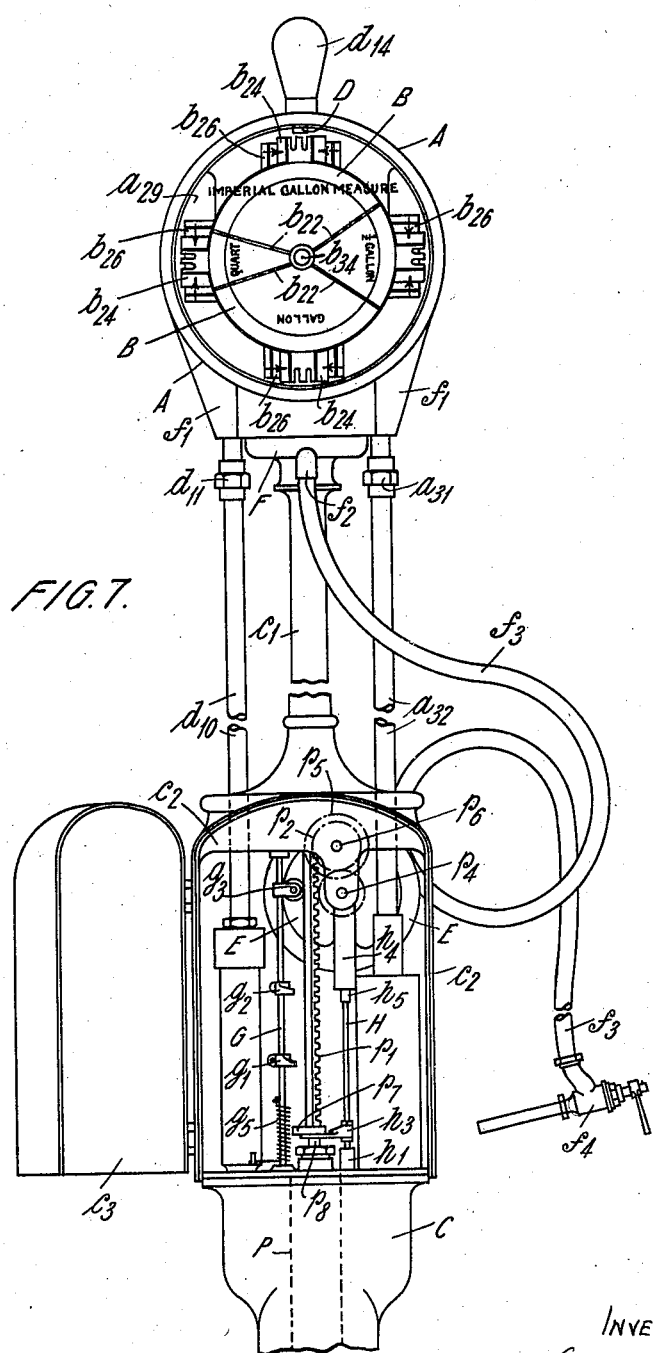

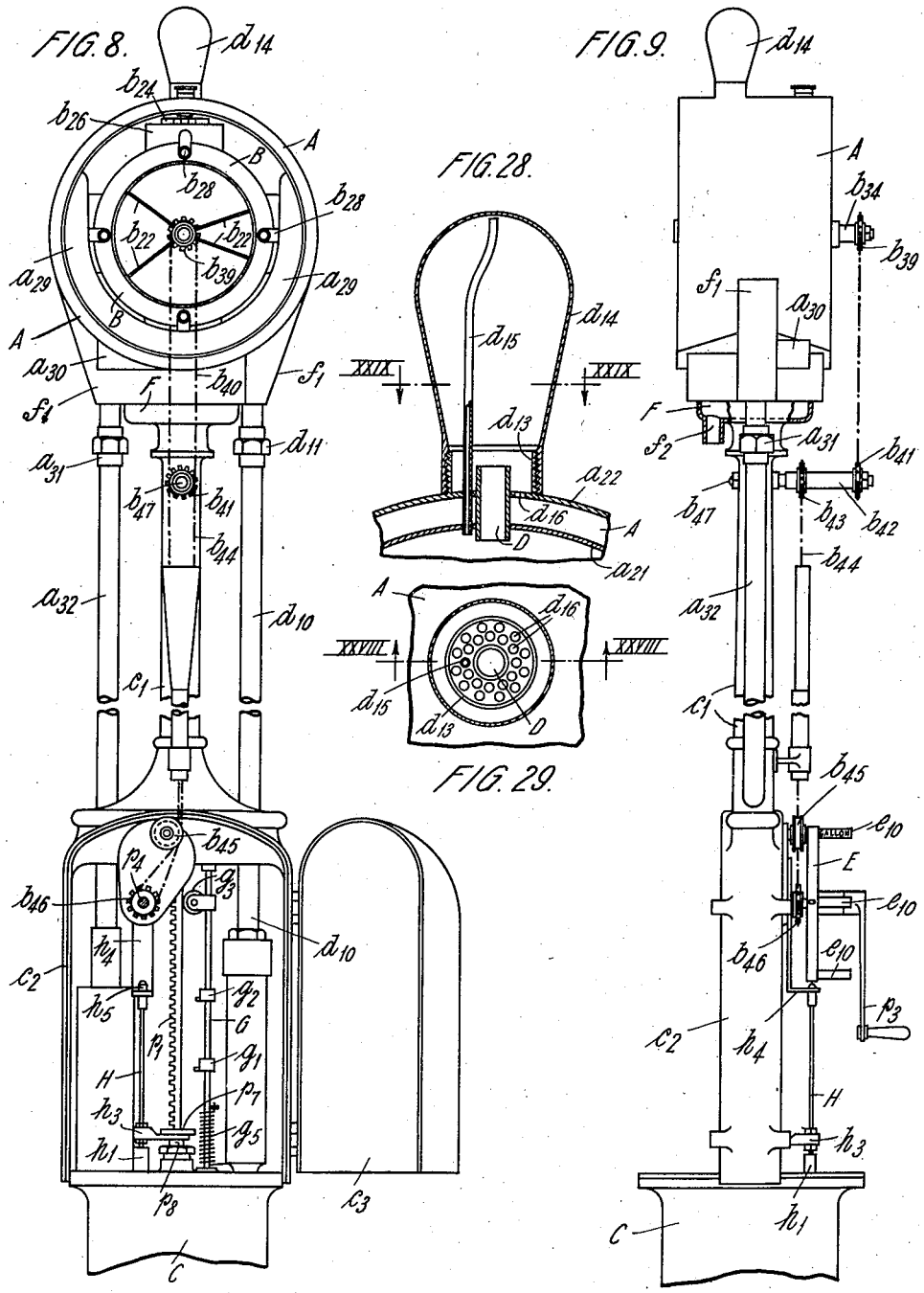

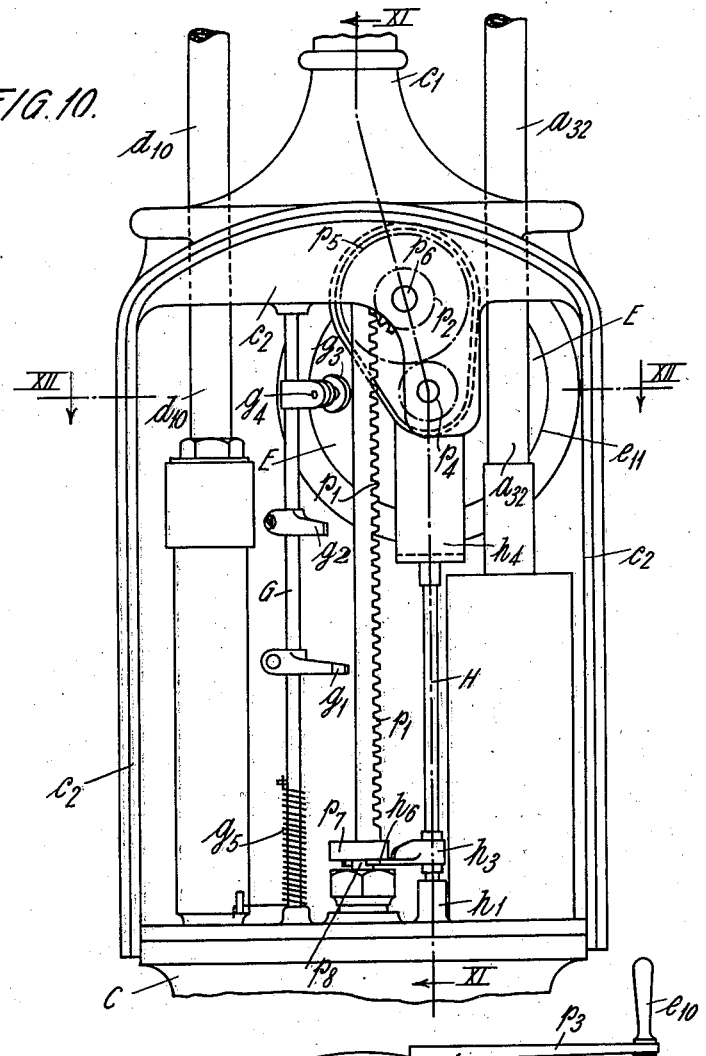
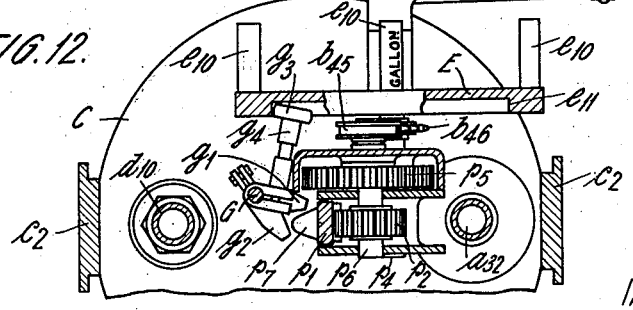

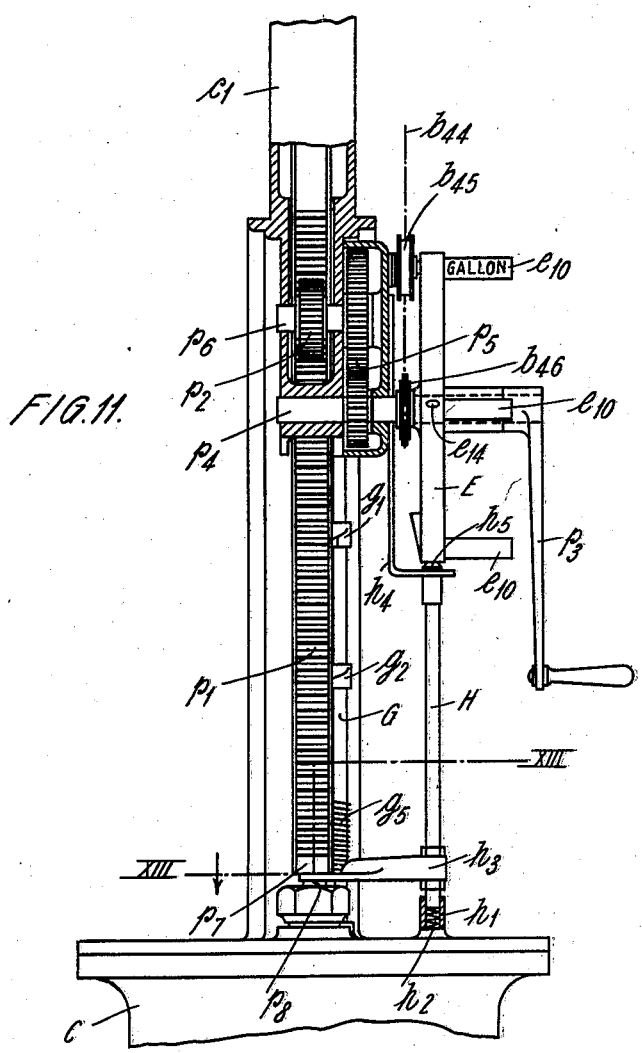
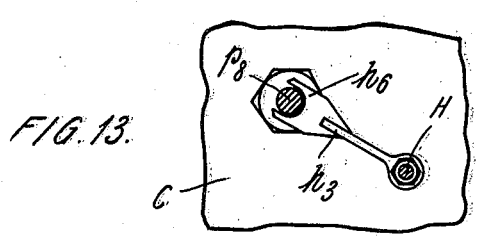

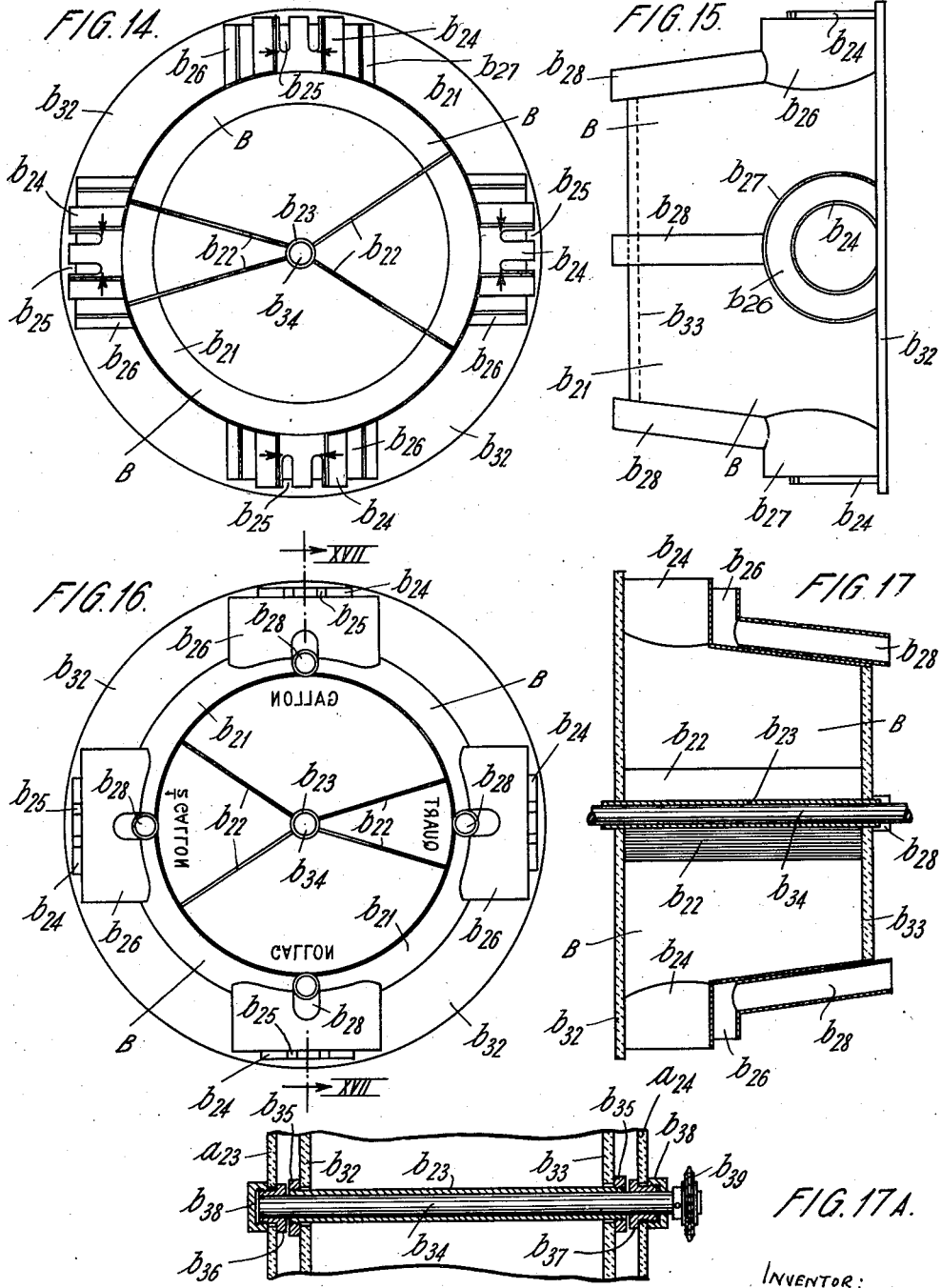

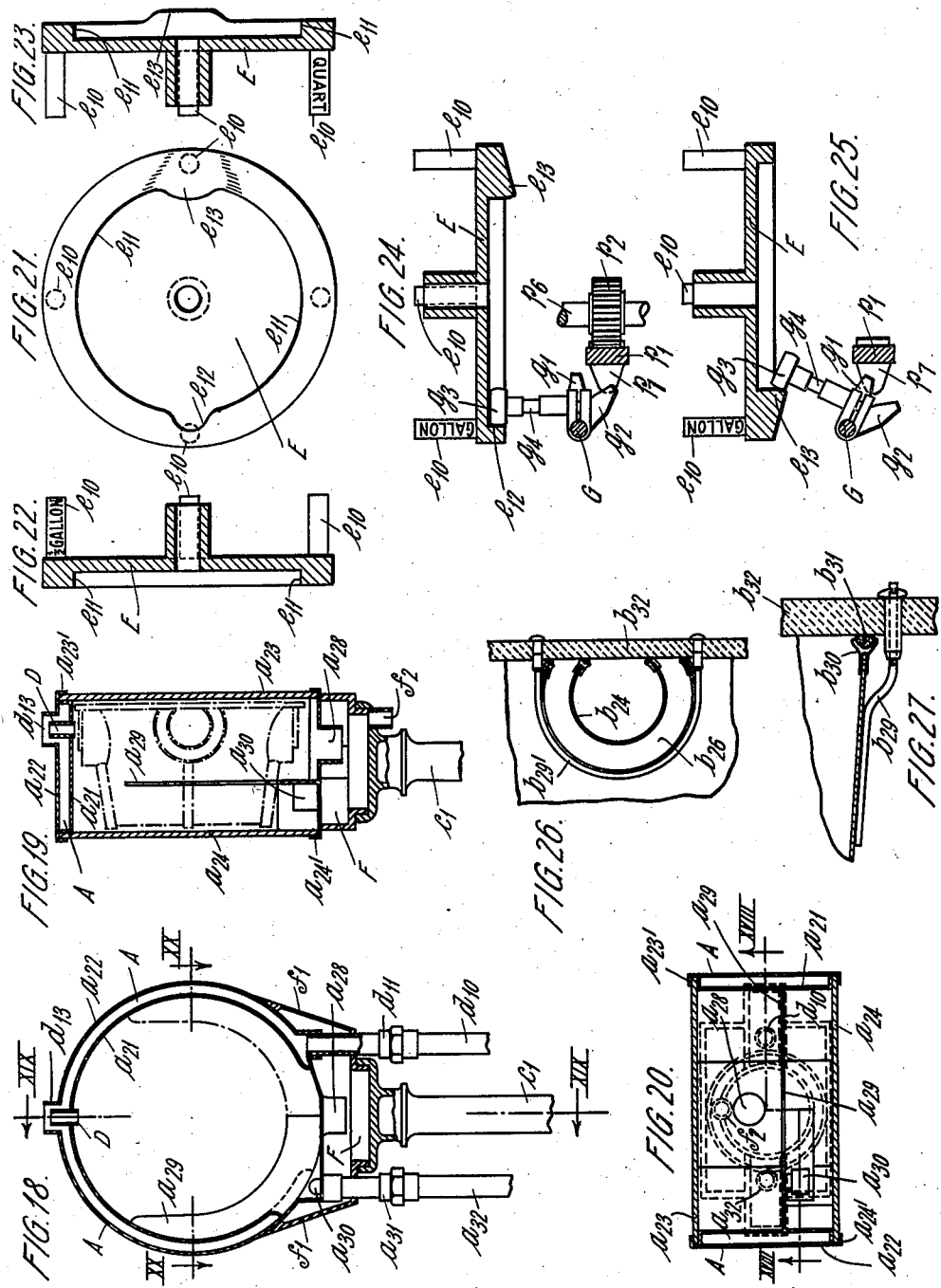

April 22, 1930.  G. WRAY  1,755,756
APPARATUS FOR DELIVERING LIQUIDS IN MEASURED QUANTITIES BY VOLUME
Filed July 1, 1926   10 Sheets-Sheet 9

INVENTOR:
GEORGE WRAY

April 22, 1930. G. WRAY 1,755,756
APPARATUS FOR DELIVERING LIQUIDS IN MEASURED QUANTITIES BY VOLUME
Filed July 1, 1926 10 Sheets-Sheet 10

INVENTOR
GEORGE WRAY
by Spear, Middleton Donaldson, Hall
Attys.

Patented Apr. 22, 1930

1,755,756

UNITED STATES PATENT OFFICE

GEORGE WRAY, OF SOUTHPORT, ENGLAND

APPARATUS FOR DELIVERING LIQUIDS IN MEASURED QUANTITIES BY VOLUME

Application filed July 1, 1926, Serial No. 119,857, and in Great Britain January 25, 1926.

This invention relates to improved apparatus for delivering liquids in measured quantities by volume, and is specially applicable to measuring apparatus for use in garages and the like to supply measured quantities of petrol, and the object is to provide an apparatus adapted to measure desired quantities accurately and expeditiously, and in the use of which the operations of filling the measuring compartments to the required level and emptying them can be observed throughout by the purchaser.

According to the invention the apparatus comprises a rotatable measuring vessel having a measuring compartment, or several such compartments adapted respectively to measure different volumes, the measuring vessel being so mounted, in relation to a spout to which the liquid to be measured is supplied by suitable control means, and in relation to a delivery pipe, that the vessel can be turned from a position in which a compartment is adapted to be filled by the spout, to a position in which the contents of the said compartment are discharged to the delivery pipe. The vertical side or sides of the measuring vessel are preferably made of a transparent material, or are fitted with windows, so arranged that the operation of filling the compartment, the level to which the compartment is filled and the operation of emptying the compartment, are visible. The respective measuring compartments are preferably fitted with an overflow opening at a level corresponding with the volume to be measured, and the measuring compartment is mounted in a casing so arranged that the liquid is discharged to the delivery outlet, whereby the filling of the compartment with the desired volume is ensured, by supplying an excess of liquid to the compartment which excess passes through the overflow opening.

Usually there are four compartments, two of them each having a capacity equal to the most frequently employed unit, say a gallon, and these compartments are arranged diametrally opposite so that as the one is emptied the other may be filled. When the liquid reaches the desired level in any compartment any surplus overflows and returns to the store tank.

Each of the compartments of the measuring vessel is preferably fitted with a fill-pipe provided with overflow outlets, which pipe is brought under the supply spout in the act of filling, and the transverse cross-sectional area of which is considerably less than that of the portion of the measuring compartment with which it communicates.

In the preferred arrangement the measuring vessel takes the form of a frustum of a cone with transparent ends, and is mounted on a horizontal axis in a container also having transparent ends; the vessel is divided into measuring compartments of different capacities by radial partitions, and each compartment is provided with a fill-pipe, the compartment which is being filled being turned into the upper position with its fill-pipe below the supply spout, the overflow from the fill-pipe being led to the rear part of the outer casing and being returned to the store tank; when it is desired to empty the compartment it is turned through 180 degrees and discharges its contents through the fill-pipe to a sump in the front part of the container to which any suitable form of delivery pipe is fitted.

The filling of the compartments may be effected by connecting the supply spout through a suitable control valve to a supply of liquid having the necessary head, or where the liquid is below the apparatus, the supply spout may be fed by means of a pump or by displacing the liquid in the tank, or by subjecting the liquid to the necessary pressure; usually a pump is employed which may be set to give slightly more than the quantity of liquid necessary to fill the respective compartments, and the means by which the quantity delivered by the pump is varied to suit the different compartments may be controlled by the movement of the rotatable measuring vessel, so that the pump is set to deliver the quantity corresponding with the vessel then being filled.

The invention also comprises improvements in connection with the delivery pipe supplying the vessel; the overflow arrangements; locking arrangements to prevent discharge until the desired level of liquid corresponding with the required measure has been reached; and other details of construction, all as hereinafter described and claimed.

The invention is illustrated in the accompanying drawings, in which:—

Figs. 1 to 3 illustrate, more or less diagrammatically, the arrangement when the axis of the measuring vessel is horizontal.

Figs. 4 to 6 are similar views showing the arrangement when the axis of the measuring vessel is vertical.

Figs. 7 to 31 show the preferred form of apparatus, suitable for application to existing types of measuring devices.

In the drawings:—

Fig. 1 is an elevation;
Fig. 2 a side elevation; and
Fig. 3 a corresponding plan; each of the views being shown partly in section.
Fig. 4 is an elevation;
Fig. 5 a side elevation; and
Fig. 6 a plan view; each of these views also being partly in section.
Fig. 7 is a front elevation;
Fig. 8 a rear elevation, with the handle and locking-wheel removed;
Fig. 9 a side view, with the gear box doors removed;
Fig. 10 an enlarged view of part of Fig. 7;
Fig. 11 a corresponding side view in section on the line XI, XI of Fig. 10, with the casing removed.
Fig. 12 a plan in section on the line XII, XII of Fig. 10; and
Fig. 13 a fragmentary plan in section on the line XIII, XIII of Fig. 11.
Fig. 14 is a front elevation of the measuring vessel;
Fig. 15 being a corresponding side elevation;
Fig. 16 is a rear elevation; and
Fig. 17 a sectional side elevation on the line XVII, XVII of Fig. 16.
Fig. 17A is a detail view showing the axis and bearings.
Fig. 18 is a rear elevation of the fixed outer casing, in section on the line XVIII, XVIII of Fig. 20;
Fig. 19 is a side elevation on the line XIX, XIX of Fig. 18; and
Fig. 20 is a plan on the line XX, XX of Fig. 18.
Fig. 21 is a front elevation of the handwheel and cam plate;
Figs. 22 and 23 are side elevations in section.
Figs. 24 and 25 being sectional plans of the cam plate showing the pump control shaft and the levers thereon.
Figs. 26 and 27 show the method of making the joint between the glass and metal parts.

Figure 30:
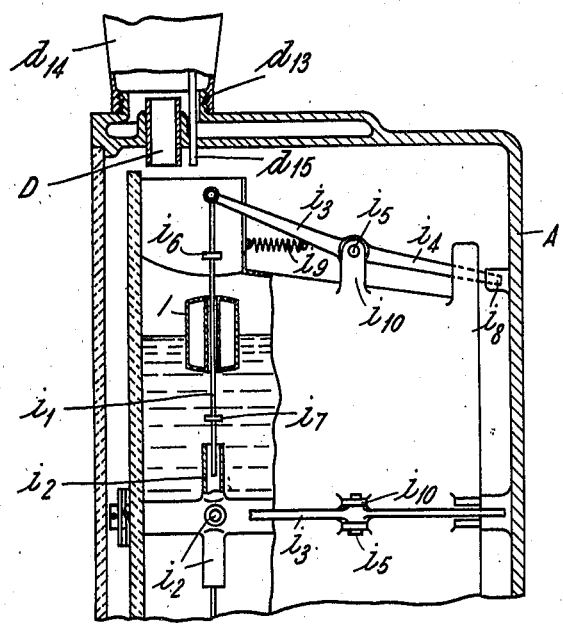
Figure 31:
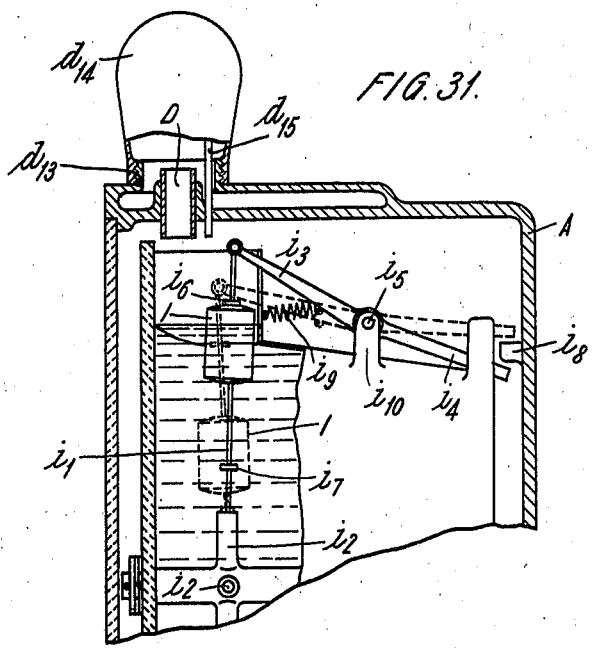
Figure 32:
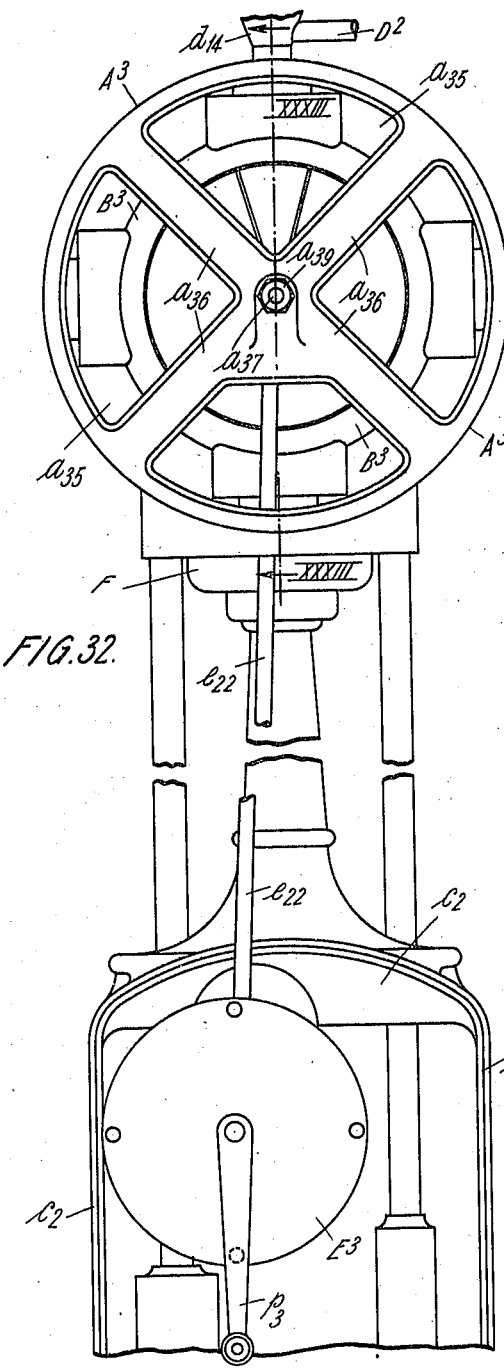
Figs. 32 and 33 show a modified arrangement of the fixed casing and gear.
Figure 33:
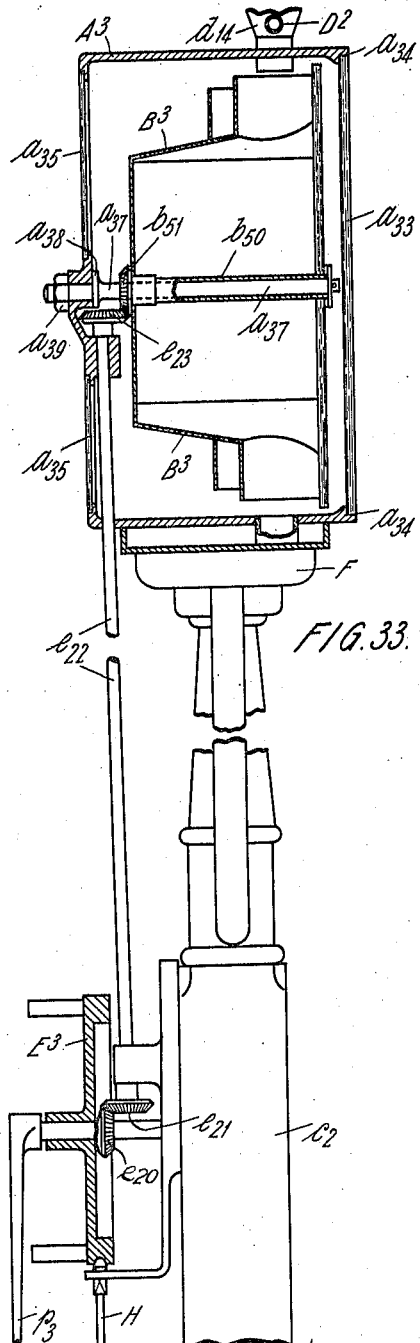

Fig. 28 is an elevation of the air vessel and delivery spout in section on the line XXVIII, XXVIII of Fig. 29; and
Fig. 29 is a corresponding plan on the line XXIX, XXIX of Fig. 28.
Figs. 30 and 31 are side elevations in section and show a float operated locking device; and
Figs. 32 and 33 are side and rear elevations, the latter being partly in section, showing a modification of the construction of the fixed outer container and the driving gear.

Referring first to Figs. 1 to 3;—

$A'$ is a fixed casing having a front window $a^1$ and a rear window $a^2$, which casing is mounted on any suitable supporting structure, such as the columns $C'$, at a height sufficient to enable the liquid to be delivered by gravity from the sump $a^3$, through the discharge pipe $a^4$, to the tanks of, for instance, motor vehicles.

B is a rotating measuring vessel which in shape is preferably a frustum of a cone, having a front transparent window $b^1$, and a rear transparent window $b^2$; the vessel $B'$ is mounted on the axis $b^3$ supported in suitable journals in the casing $A'$, and is rotatable by any suitable means such as bevel wheels $b^4$ and actuating shaft $b^5$.

The measuring vessel is divided by radial partitions $b^6$ into four compartments; the two larger and diametrically opposite compartments may conveniently be adapted to measure the unit employed when supplying a quantity of liquid, for instance, several gallons, the small compartments measuring different fractions of a gallon. Each compartment is fitted with a fill-pipe $b^7$ having overflow notches $b^8$ so arranged that when the level of liquid in the fill-pipe corresponds with the notches, the compartment contains the desired volume to be measured; the liquid which overflows through the overflow notches $b^8$ is led back to the store tank in any convenient manner.

In the example illustrated overflow wells $b^9$ are provided which surround the respective fill-pipes and into which the liquid which overflows passes, and from which the said liquid is led by respective overflow pipes $b^{10}$ to the rear end of the casing $A'$, from which it passes through a suitable pipe $a^5$ and is returned to the store tank.

$D'$ is the supply pipe to which the liquid to be measured is supplied by any convenient means, say under a suitable head, the flow being controlled by any suitable device such as a cock or valve indicated at $d^1$.

When a particular measure is required the corresponding compartment is moved to the position in which its fill-pipe is below the supply pipe, and liquid is supplied until it begins to overflow through the notches $b^8$; as the cross-sectional area at the liquid level is then comparatively small, being that of the fill-pipe $b^7$, the capacity can accurately be calibrated; the filling of the compartment and the rising of the liquid to the desired level can be observed by the purchaser through the window $b^1$, the said window also forming the front of the fill-pipe as shown. When the uppermost compartment has been filled it is rotated through 180 degrees, whereupon the contents are discharged through the fill-pipe $b^7$ into a sump $a^3$, which if desired may also have a glazed front, the liquid passing through the sump to the discharge pipe $a^4$ which may conveniently be fitted with a hose pipe or the like to deliver to the desired receptacle, for instance, a petrol tank of a motor vehicle. The parts of the window $b^1$ corresponding with the respective compartments would have indicated thereon the capacity of the respective compartments.

Where, for instance, several gallons of liquid have to be supplied, the two oppositely located one-gallon compartments are alternatively brought to the filling position, the one compartment emptying as the other is being filled, thus materially reducing the time required to measure the given quantity.

Where the axis of the measuring vessel is vertical, the arrangement takes the form illustrated in Figs. 4 to 6, in which $A^2$ is the fixed casing, and $B^2$ the rotating measuring vessel; the measuring vessel $B^2$ is carried by a suitable shaft $b^{11}$ mounted in suitable bearings formed, for instance, by a ball race $a^{12}$ carried from a central boss $a^{13}$ formed in the interior of the container $A^2$, the upper end of the axis being carried by a bearing $a^{14}$ formed in the cover $a^{15}$, and the lower end being steadied by a bearing $a^{16}$ formed in the base plate $a^{17}$ by which the containing vessel $A^2$ is carried by columns such as $a^{18}$, which in turn are supported by a suitable stand or base $a^{19}$.

The measuring vessel is divided by vertical partitions $b^{6\prime}$ into two one-gallon compartments oppositely located, and intermediate compartments having capacities corresponding with fractions of a gallon.

As before each compartment is provided with a fill-pipe $b^{12}$ having overflow notches $b^{13}$, the top of each compartment with the exception of the fill-pipe being closed by a conical cover $b^{14}$ having an extending ledge $b^{15}$ reaching nearly to the interior of the container $A^2$, so that the liquid overflowing through the notches $b^{13}$ is shed by the cover $b^{14}$, and is discharged into the part $a^6$ of the outer container, from which it drains through the pipe $a^7$ to the store tank; the part $a^6$ of the container $A^2$ is divided from the part $a^8$ by the radially disposed partition $a^9$ which extends to a suitable height radially across the vessel. The part $a^8$ is fitted with a discharge pipe $a^{10}$.

Each compartment is at its lower end provided with a valve $b^{16}$ which is normally closed, but the stem $b^{17}$ of this valve, when the respective compartments come opposite the discharge pipe $a^{10}$, engages with a cam plate $a^{11}$ made in bracket form and supported from the interior of the casing $A^2$. Engagement of the stem $b^{17}$ with the cam $a^{11}$ raises the valve so that the contents of the compartment are then discharged into the part $a^8$ of the container $A^2$, and thence by the discharge pipe $a^{10}$ to any desired receptacle.

Each compartment is fitted with a glazed front $b^{18}$ which also extends over the front portion of the fill-pipe, and each compartment has an air vent $b^{19}$, the top of which is carried to or above the height of the overflow notches $b^{13}$.

$D^2$ is the supply pipe, which in the example illustrated is fitted with an air vessel $d^2$ having a vent pipe $d^3$, the lower end of which opens into the interior of the vessel $A^2$, and the upper end of which opens into the upper end of the air vessel $d^2$; the object of the air vessel is to prevent too sudden a flow of liquid from the supply pipe $D^2$ to the fill-pipe.

The pipe $D^2$ may be supplied with the liquid to be measured in any convenient manner; in the example illustrated the pipe $D^2$ is connected to the interior of one of the columns $a^{18}$ which in turn is connected through a suitable control valve to a store tank which may be below the apparatus, and from which the liquid to be measured is pumped to the pipe $D^2$, or the store tank may be sufficiently high to give a gravitational flow.

The appropriate one of the four measuring compartments is brought below the supply pipe $D^2$ by rotation imparted to the shaft $b^{11}$ by a hand wheel $E'$ geared by bevel wheels $e^1$ to a vertical shaft $e^2$ which is geared by the spur wheels $e^3$ to the shaft $b^{11}$. The hand wheel is provided with studs $e^4$ bearing labels corresponding with the four measuring compartments.

Where, as hereinafter described, a variable-stroke pump is used to deliver the liquid to be measured to the pipe $D^2$, and it is desired that the pump shall deliver quantities corresponding with the capacities of the measuring compartments then under the supply pipe, the wheel $E'$ may be fitted with a cam which in the manner hereinafter described operates means which limit the stroke of the pump according to the angular position of the wheel $E'$ and therefore of the measuring vessel $B^2$.

The container $A^2$ may be constructed entirely of glass as in the example illustrated, or, of course, it may be of metal with glass windows.

It will be seen that the operations of filling a compartment to the desired level and of emptying it through the pipe $a^{10}$ can be closely observed by the purchaser, and that the volume delivered, providing the compartment is filled to the level of the overflow notches, is quite independent of the initial height of the liquid in the pipe $D^2$. Where the pipe $D^2$ is supplied by means of the variable-stroke pump, the liquid delivered by the pump to supply the respective compartments would be arranged to be slightly in excess of the quantity required to fill the compartment to the desired level, so as to eliminate errors due to leakage and the like, the surplus returning to the store tank through the overflows.

Referring now to Figs. 7 to 31, which illustrate the preferred arrangement so constructed as to be adapted to be applied to existing liquid measuring devices comprising a variable-stroke pump drawing its supply from a store tank containing liquid to be delivered,—

A is the outer casing which is carried from the upper end of a column $c^1$ in turn carried by a gear box $c^2$ supported from the pedestal C, the latter being supplied with a suitable foot by which it is attached to a suitable foundation; the arrangement of the pedestal C and box $c^2$ fitted with doors $c^3$, is that commonly employed in connection with the variable-stroke pump measuring devices, the pump P being enclosed in the pedestal C, and the gear for operating it being enclosed in the box $c^2$. The pump which may be of the ordinary suction lift type is operated by a rack $p^1$, pinion $p^2$ and handle $p^3$ (see Fig. 11), the shaft $p^4$ of which is geared by intermediate gearing $p^5$ to the pinion shaft $p^6$.

The pump delivers the liquid to a supply pipe $d^{10}$, which pipe (see Fig. 18 which is a rear view and shows the pipe $d^{10}$ on the right-hand side) is connected by a suitable union $d^{11}$ to an annular space between the inner and outer walls $a^{21}$ and $a^{22}$ of the cylindrical portion of the casing A. The liquid supplied rises in the said annular space and passes to the supply spout, D. This spout makes joint with the inner wall $a^{21}$ and extends into a spigot $d^{13}$ carried from the outer wall $a^{22}$; the portion of the wall $a^{22}$ between the supply spout D and the spigot $d^{13}$ being perforated as shown at $d^{16}$ in Figs. 28 and 29, and the spigot $d^{13}$ being fitted with an air-vessel $d^{14}$, which air vessel is fitted with a vent-pipe $d^{15}$ carried through the walls $a^{21}$ and $a^{22}$, its lower end opening into the interior of the casing A, and its upper end being carried to the upper end of the air vessel $d^{14}$. The liquid supplied to the annular space rises through the perforations $d^{16}$, part of the liquid passing down through the spout D and part passing into the air vessel $d^{14}$.

The object of the air vessel is to prevent too sudden a rush of liquid through the spout D. The liquid passing into the air vessel $d^{14}$ ultimately is delivered through the spout D, the level of liquid, after a filling operation should there be no leakage at the pump, remaining at or about the level of the top of the supply spout D. The front and back of the casing A are closed by glass windows $a^{23}$ and $a^{24}$ which are jointed to the walls of the casing in any suitable manner; for instance, by forming flanges $a^{23'}$ and $a^{24'}$ which may be screw-threaded to fit the threaded ends of the outer wall $a^{22}$ of the casing A.

The interior of the casing A is provided with an outlet $a^{28}$ which opens into an enclosed sump F the walls of which are extended as at $f^1$ and make joint with the exterior surfaces of the wall $a^{22}$; the wall $a^{21}$ is not carried right round the casing, but is stopped-off on each side of the outlet $a^{28}$ as shown.

The interor of the casing is fitted with a transverse partition plate $a^{29}$, the outlet $a^{28}$ being on the front side of this partition, and a second outlet $a^{30}$ being formed at the bottom of the wall $a^{22}$, the latter outlet being connected by a union $a^{31}$ and pipe $a^{32}$ leading to the store tank. The unions $a^{31}$ and $d^{11}$ pass in fluid-tight manner through the sump F. The sump F is fitted with an outlet pipe $f^2$ to which a hose pipe $f^3$ and nozzle $f^4$ may be fitted, by which the liquid delivered to the sump is conveyed to any desired receptacle.

The casing A is fitted with a rotating measuring vessel B, the construction of which will be understood by reference to Figs. 14 to 17A. The circumferential wall of the vessel $b^{21}$ has the configuration of the frustum of a cone, the larger diameter being at the front side and the small diameter being at the rear. The interior is divided into the necessary number of compartments by radial partitions $b^{22}$, the inner ends of which make joint with the central tube $b^{23}$, and the outer ends of which contact with the wall of the vessel $b^{21}$.

In the case illustrated there are four such partitions, and they divide the interior of the vessel B into four compartments, each of two equal oppositely located compartments being designed to measure one gallon, and the intermediate compartments to measure respectively half-gallons and quarts. Each compartment is fitted with a fill-pipe $b^{24}$, the bottoms of the fill-pipes making joint with suitable openings formed in the wall $b^{21}$ so that the interiors of the fill-pipes communicate with the respective interiors of the measuring compartments. Each fill-pipe is provided with overflow notches $b^{25}$, and around each fill-pipe is provided an annular overflow well or sump $b^{26}$ formed by the circular wall $b^{27}$, the lower edge of which makes joint with the wall $b^{21}$ of the casing, and each well is provided with an outlet pipe $b^{28}$. The front portion of the fill-pipe and the front portion of the wall $b^{27}$ are cut away as shown in Figs. 15 and 26, the respective cut edges lying in the same transverse plane as the front circular edge of the wall $b^{21}$ and the front edges of the partitions $b^{22}$, so that the inner face of a glass window $b^{32}$ makes joint with these respective edges.

The joints between the inner faces of the glass windows $b^{32}$ and $b^{33}$, and the edges of the wall $b^{21}$ and the partitions $b^{22}$, are made as shown in Fig. 27; tie rods $b^{29}$ are secured to the plate $b^{21}$ and the glass windows are drilled to take the screw-threaded ends of the rods, the joint being made by tightening the nuts fitting the rods. The edges of the plate $b^{21}$ and the partitions $b^{22}$ are fitted with grooved strips $b^{30}$, the joint being made between the glass and a packing $b^{31}$ fitted in the groove.

The joints between the edges of the walls $b^{26}$ of the well and the edges of the fill-pipe $b^{24}$ are fitted with grooved strips $b^{30}$ fitted with packing $b^{31}$, and the joint is made by the tie rods $b^{29}$, which pass around the wall $b^{26}$, as shown in Fig. 26, the screw-threaded ends passing through the window $b^{32}$ and being fitted with tightening nuts.

The rear end of the measuring vessel is fitted with a glass window $b^{33}$ which makes joint with the circular rear edge of the plate $b^{21}$ and the rear edges of the several partitions $b^{22}$ in the manner described in connection with the window $b^{32}$.

The measuring vessel constructed as described is mounted on a spindle $b^{34}$, which is fitted within and secured to the tube $b^{23}$, and which is held in place by the end nuts $b^{35}$; bearings for the spindle $b^{34}$ are formed by screwed sleeves $b^{36}$ and $b^{37}$ secured respectively in central holes formed in the front and rear glass windows $a^{23}$ and $a^{24}$ of the container A, which sleeves are held in positions by nuts $b^{38}$.

The measuring vessel is mounted in the container as shown in Figs. 7 and 8, and on the rear protruding end of the spindle $b^{34}$ a chain wheel $b^{39}$ is fixed, the chain wheel, the spindle, the tube $b^{23}$ and the measuring vessel rotating together. The chain wheel $b^{39}$ (see Fig. 9) is geared by a chain $b^{40}$ to a chain wheel $b^{41}$ on a sleeve $b^{42}$ carried by a stud $b^{47}$ on which sleeve is mounted a second chain wheel $b^{43}$ on one side of the chain $b^{44}$ (which passes round the guide pulley $b^{45}$) to the chain wheel $b^{46}$ which is secured to a hand wheel E loosely mounted on the shaft $p^4$, the gearing being so arranged that the hand wheel E and the measuring compartment B have equal angular velocities.

The hand wheel E is provided with four studs $e^{10}$ on which are respectively engraved the measuring capacities of the respective measuring compartments into which the measuring vessel B is divided, and the gearing is so arranged that when the stud corresponding to a particular measure is moved to its uppermost position, as shown in Fig. 9, the corresponding compartment has its fill-pipe $b^{24}$ brought under the supply pipe D.

Where, as in the modification now described the measuring compartments are filled through the action of a pump, the appropriate stroke of the pump for the particular compartment then being filled is ensured by operating a vertical shaft G (see Figs. 7 and 10) through a cam surface formed in the interior of the rim of the wheel E, so as to impart the angular movement to the shaft G necessary to bring into the path of movement of a stop piece $p^7$, fixed to the rack $p^1$, the appropriate limit stop $g^1$ or $g^2$; the limit stop $g^1$, in the example illustrated, arresting the movement of the pump bucket when the compartment measuring a quart is below the delivery spout D; and the limit stop $g^2$ limiting the stroke of the pump when the half gallon compartment is being filled, both limit stops $g^1$ and $g^2$ being moved clear of the stop piece $p^7$ when either of the one-gallon compartments has to be filled, the movement of the stop piece $p^7$ being then arrested when it engages with the underside of the main casing $c^2$ or other suitable fixed point.

The arrangement for imparting movement to the shaft G comprises a cam surface $e^{11}$ (see Figs. 21 to 25) which is formed on the inside of the rim of the wheel E, said cam surface having a depression $e^{12}$ and a projection $e^{13}$ adapted to engage with the roller $g^3$ of the cam lever $g^4$, keyed to the shaft G which latter is fitted with a spring $g^5$ (see Fig. 10) which tends to keep the cam roller $g^3$ in contact with the cam surface.

When the roller is in contact with the depression $e^{12}$ the limit stop $g^2$ is interposed in the path of the stop piece $p^7$ (see Fig. 24); when the cam roller is in contact with the projection $e^{13}$ the limit stop $g^1$ is interposed in the path of the stop piece $p^7$ (see Fig. 25); when the cam roller is in contact with the intermediate surface $e^{11}$ both limit levers $g^1$ and $g^2$ are clear of the piece $p^7$ (see Fig. 12).

When a particular measuring compartment is being filled, the wheel E is, as soon as the rack $p^1$ commences to move upwardly, locked by a rod H, the lower end of which is carried in the foot-step bracket $h^1$, a spring $h^2$ being interposed between the lower end of the rod and the bottom of the bore of the bracket, which spring tends normally to move the rod H upwardly. Upward movement of the rod in the non-locking position is prevented by a lever $h^3$, the end of which engages the underside of the stop piece $p^7$ when the latter is in its lowest position, the lever $h^3$ having a forked end $h^6$ which embraces the part $p^8$ of the pump rod to which the rack $p^1$ and the stop piece $p^7$ are attached; when the stop piece $p^7$ moves up as the pump is operated, the lever $h^3$ is released and the rod H is moved upwardly by the spring $h^2$, the upper end $h^5$ of the rod H, which is guided by the bracket $h^4$, then engaging with the appropriate hole $e^{14}$ in the rim of the wheel E, thus locking this wheel and the measuring vessel geared to it in the appropriate filling position. This lock is not removed until the return stroke of the pump is completed by the reverse movement of the handle $p^3$, when the stop piece $p^7$ again engages the lever $h^3$. This provides a sufficiently long time interval after the operation of the pump to ensure that the whole of the liquid delivered by the pump shall be delivered to the fill-pipe of the compartment then being filled, thus preventing the vendor from moving, by the operation of the wheel E, a compartment from its filling position to its discharging position until it has been filled to the requisite level.

Where it is desired to provide an independent locking device to prevent the measuring vessel being moved from its filling position until the compartment then being filled is full, the device illustrated in Figs. 30 and 31 is fitted. Each compartment is provided with a float I slidable on a float rod $i^1$, the lower end of which is guided by a foot-step bracket $i^2$ and the upper end of which is attached to the arm $i^3$ of a double armed lever fulcrumed at $i^5$ on the bracket $i^{10}$; the other arm $i^4$ of which lever is adapted, when the float is intermediate stop pieces $i^6$ and $i^7$ fixed on the float rod $i^1$, to be brought by the spring $i^9$ into engagement with a fixed slotted locking piece $i^8$ carried by the containing vessel A.

When the compartment is empty the weight of the float I on the lower stop $i^7$ raises the arm $i^4$ clear of the locking piece $i^8$. The float of the compartment which is below the delivery pipe will, as soon as the compartment begins to fill, be supported by the liquid therein and will rise clear of the stop $i^7$, thus allowing the spring $i^9$ to pull the lever $i^4$ into engagement with the stop $i^8$ and so prevent movement of the measuring vessel until the vessel is filled to the level of the overflow, when the upward pressure of the float I on the stop $i^6$ raises the arm $i^3$ and depresses the arm $i^4$ so as to move the latter clear of the stop $i^8$, whereupon the measuring vessel can be rotated to move the compartment then filled from its filling to its discharging position.

The action is as follows:—

Assuming that a half-gallon of liquid has to be measured;—the wheel E is rotated until the stud bearing the words half-gallon is moved to the top position, this brings the fill-pipe of the half-gallon measuring compartment below the supply spout, and brings the limit stop $q^2$ in line with the stop piece $p^7$. The pump is then operated by the handle $p^3$, this raises the locking piece $p^7$, whereupon the lever $h^3$ is freed, and the locking rod H engages with the appropriate hole in the wheel E, thus locking the wheel E and measuring vessel. The pump is operated until the locking piece $p^7$ engages with the limit stop $g^2$, and this stop is preferably so located on the rod G that slightly more than half a gallon of liquid is delivered by the pump.

Assuming that the level of the liquid, after the previous measuring operation, coincided with the top of the delivery spout, it will be seen that the pump action will ultimately deliver through the delivery spout to the fillpipe slightly more than half a gallon; the surplus will overflow through the overflow notches $b^{25}$ into the sump $b^{26}$ and thence through the outet pipe $b^{28}$, the surplus liquid flowing to the interior of the container in rear of the partition plate $a^{29}$, and finding its way through the outlet $a^{30}$, union $a^{31}$ and pipe $a^{32}$ back to the store tank.

This operation will have been completed by the time the return stroke of the pump is made and the wheel E unlocked. Should, however, for any reason, the liquid level in the half gallon compartment not be raised to the overflow level, the operation of the float I will prevent movement of the measuring vessel. Assuming however that the desired level has been reached, the measuring vessel is then turned through 180 degrees by the operation of the wheel E, whereupon the contents of the vessel will be discharged through the outlet $a^{28}$ into the sump F and thence by the outlet pipe $f^2$, the hose pipe $f^3$ and nozzle $f^4$ to the desired receptacle.

It will be observed that by the provision of the glazed end window, the operation of filling the compartment can be observed by the intending purchaser, and that by following the movement of the measuring vessel from the filling to the discharge position he can be satisfied that the correct quantity of liquid as measured, is delivered through the hose pipe $f^3$.

It will further be seen that whilst there is no necessity for using a pump in conjuction with a measuring vessel, a pump the stroke of which is controlled in accordance with the movement of the measuring vessel, forms a convenient adjunct to the apparatus, with a further advantage that the invention can be applied with comparatively little alteration, to the variable stroke pump delivering devices now in general use.

It will further be seen that where a specified number of gallons of liquid have to be delivered, the fact that the two one-gallon compartments are diametrally opposite, permits the use of the apparatus in such manner as to bring these two compartments alternately under the supply spout, the one compartment emptying at the same time the other is filling, thus reducing the time required to measure a given number of gallons.

The arrangement of a rod such as G and limit stops such as $g^1$ and $g^2$ whereby the stroke of the pump can be varied so as to deliver a given quantity of liquid is well known in connection with pumps of this type.

It will be seen however that unless the liquid in the delivery pipe is maintained, between successive measuring operations, at the overflow level in the stand pipe, the portion of the measured quantity of liquid delivered by the pump will, in the ordinary type of variable stroke pump measuring devices, be used to fill the stand pipe to the said level, and will be lost to the purchaser. The addition of the measuring apparatus described however, prevents this possibility of loss to the purchaser.

The arrangement illustrated in Figs. 32 and 33 is substantially similar to that described, except that the fixed outer casing $A^3$ may be made mainly of metal, the front window $a^{33}$ being fitted in a suitable recess $a^{34}$, the rear windows $a^{35}$ being of sector-shape and being fitted in suitable recesses formed between the arms $a^{36}$. In this case the cylindrical portion need not be constructed with an annular space between inner and outer walls, the supply pipe $D^2$ being led directly to the air vessel and supply spout D.

In order to obviate the necessity to form a bearing at the centre of the front window $a^{33}$, a spindle $a^{37}$ having a flange $a^{38}$ and nut $a^{39}$ may be secured in position in a hole in the centre of the rear end, the tube $b^{50}$, passing through the centre of the vessel $B^3$, being rotatably mounted on the fixed spindle $a^{37}$.

This construction permits of the chain gearing between the wheel $E^3$ and the container $B^3$ being replaced by bevel gearing, the bevel wheel $e^{20}$ gearing with the bevel wheel $e^{21}$ on the spindle $e^{22}$, and the bevel wheel $e^{23}$ on the opposite end of the spindle $e^{22}$ gearing with the bevel wheel $b^{51}$ carried by the tube $b^{50}$.

Having now fully described my invention, I declare that what I claim and desire to secure by Letters Patent is:—

1. In apparatus for delivering liquids in measured quantities by volume in combination;—a fixed casing having a glazed front; a spout to which the liquid to be measured is supplied; means to control the flow of the liquid to the supply spout; a delivery pipe leading from the casing; a measuring vessel rotatably mounted in said casing and divided into a plurality of measuring compartments, each having a glazed front; a fill-pipe for each compartment; an overflow for each compartment, and means for rotating the vessel so as to bring any one of the measuring compartments into which the vessel is divided into the position in which it is filled to the overflow level through its fill-pipe from the supply spout, and afterwards for rotating the vessel so as to bring the said compartment to the discharge position in which it discharges its contents to the delivery pipe; substantially as described.

2. In apparatus for delivering liquids in measured quantities by volume in combination;—a fixed casing having a glazed front; a spout to which the liquid to be measured is supplied; means to control the flow of the liquid to the supply spout; a delivery pipe leading from the casing; a measuring vessel rotatably mounted in said casing and divided into a plurality of measuring compartments, each having a glazed front; a fill-pipe for each compartment; an overflow for each compartment, and means for rotating the vessel so as to bring any one of the measuring compartments into which the vessel is divided into the position in which it is filled through its fill-pipe from the supply spout to the overflow level, said means being adapted to bring the said compartment to the discharge position in which it discharges its contents to the delivery pipe; control means for regulating the quantities of liquid supplied by the pump at each actuation; and means connecting the control means to the measuring vessel to limit the quantity of liquid supplied by the pump to that corresponding with the measuring compartment then under the supply spout; substantially as described.

3. The combination with the elements of claim 1;—of a float located in each compartment; and means actuated by the float to hold the measuring vessel against rotation during the process of filling until the float is raised to the position it occupies when the compartment is filled; substantially as described.

4. Apparatus as claimed in claim 1, in which the upper portion of each measuring compartment is closed in with the exception of its fill-pipe, each fill-pipe having a cross-sectional area which is substantially less than that of the compartment; substantially as described.

5. In apparatus as claimed in claim 1, an air vessel fitted to the supply spout; and a vent pipe fitted to the air vessel; substantially as described.

6. In apparatus as claimed in claim 1, an outer casing divided into two receptacles, the one communicating with the delivery pipe, and the other communicating with an overflow discharge pipe, substantially as described.

7. In apparatus for measuring liquids, in combination;—a fixed casing; a supply spout; a discharge pipe; a measuring vessel rotatably mounted in the fixed casing and divided into a plurality of measuring compartments; a variable-stroke pump comprising a fixed and a movable member for delivering the liquid to be measured to the supply spout; means for actuating the movable member of the pump; movable limiting stops adapted respectively to impose a different limit to the movement of the said pump member; and means for controlling the limiting stops; substantially as described.

8. The combination with the elements of claim 2;—a disc geared to the measuring vessel so as to rotate therewith; a locking detent engaging the said disc; and releasing means connected to the pump moving member for rendering said detent inoperative; substantially as described.

9. In apparatus as claimed in claim 7;—a stop on the pump moving member; a shaft; a cam geared to the measuring vessel so as to rotate therewith; and a cam lever mounted on the said shaft for operating the appropriate stop lever; substantially as described.

10. In apparatus as claimed in claim 7;—a stop on the pump moving member; a shaft; a cam geared to the measuring vessel so as to rotate therewith; a cam lever mounted on the said shaft for operating the appropriate stop lever; a disc on the cam shaft, a locking detent engaging with said disc, means urging the said detent into engagement and releasing means actuated by the movable pump member to hold the said detent out of said engagement when the movable member is in zero position; substantially as described.

11. In combination with a fixed casing having a glazed front, a supply spout and a delivery pipe; a measuring vessel, a glazed front for said measuring vessel, said vessel being mounted on a horizontal axis in the said casing and having a circular transverse cross-section; radial partitions to divide the measuring vessel into a plurality of measuring compartments, a fill pipe fitted to each compartment, overflows fitted in each fill pipe at the level at which the liquid stands when the fill pipe is in its upper vertical position and the compartment contains the full quantity of the liquid to be measured, means for rotating the measuring vessel to bring any particular compartment into the filling and emptying positions; substantially as described.

12. In apparatus as claimed in claim 11, providing the fill pipes for the respective compartments with an opening at the front side, the edges of the said openings coinciding with the transverse plane containing the front edges of the measuring compartment and the radial partitions, the end of the measuring vessel and the openings in the front of the fill pipes being closed by a single plate of transparent material; substantially as described.

13. In apparatus as claimed in claim 11, an overflow sump for each of the fill pipes, an overflow pipe for each overflow sump, and leading to an overflow discharge pipe; substantially as described.

14. In apparatus as claimed in claim 11, a transverse diaphragm in the outer casing to divide it into two compartments, a front compartment discharging through the delivery pipe, and a rear compartment discharging through an overflow discharge pipe, the diameter of the rear of the measuring vessel being less than the front of the measuring vessel; substantially as described.

15. In apparatus as claimed in claim 11, an outer casing with a double cylindrical wall to form an annular space between the walls, a liquid delivery pipe leading to the said annular space, a supply spout communicating with said annular space and adapted to deliver into the respective fill pipes, and an air vessel the interior of which communicates with the said annular space and the said supply spout; substantially as described.

In testimony whereof I set my hand.
GEORGE WRAY.